US007006787B1

(12) United States Patent
Sherif et al.

(10) Patent No.: US 7,006,787 B1
(45) Date of Patent: Feb. 28, 2006

(54) MOBILE TO MOBILE DIGITAL WIRELESS CONNECTION HAVING ENHANCED VOICE QUALITY

(75) Inventors: Mahmoud R. Sherif, Bayonne, NJ (US); Ahmed A. Tarraf, Bayonne, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 468 days.

(21) Appl. No.: 09/503,990

(22) Filed: Feb. 14, 2000

(51) Int. Cl.

| | |
|---|---|
| ***H04B 3/36*** | (2006.01) |
| ***H04B 1/60*** | (2006.01) |
| ***H04B 15/00*** | (2006.01) |
| ***H04B 1/38*** | (2006.01) |
| ***H04B 1/00*** | (2006.01) |
| ***G10L 19/02*** | (2006.01) |

(52) U.S. Cl. .................... 455/7; 455/8; 455/9; 455/10; 455/63.1; 455/561; 455/563; 455/570; 375/211; 704/204

(58) Field of Classification Search ........ 455/423–426, 455/465, 426.1–426.2, 422.1, 461, 7–10, 455/15, 17, 20–24, 41.3, 563, 42–47, 500–507, 455/62, 570, 63.1, 561, 67.13, 67.16, 67.7, 455/575.2, 68–69, 70–72, 74.1, 88, 75–79, 455/313, 295, 550.1, 553.1, 562.1; 375/211–214, 375/350; 704/224, 258, 266–268, 219–220, 704/204; 370/286, 293

See application file for complete search history.

(56) References Cited

U.S. PATENT DOCUMENTS

| | | | | |
|---|---|---|---|---|
| 4,827,472 | A * | 5/1989 | Ferrieu | 370/32.1 |
| 5,694,519 | A | 12/1997 | Chen et al. | 395/2.37 |
| 5,790,632 | A * | 8/1998 | Antonio et al. | 379/3 |
| 5,903,862 | A * | 5/1999 | Weaver, Jr. et al. | 704/212 |
| 5,995,923 | A * | 11/1999 | Mermelstein et al. | 704/19 |
| 6,181,794 | B1 * | 1/2001 | Park et al. | 379/410 |
| 6,182,032 | B1 * | 1/2001 | Rapeli | 704/214 |
| 6,347,141 | B1 * | 2/2002 | Klein et al. | 379/406.08 |
| 6,434,235 | B1 * | 8/2002 | Minkoff | 379/406.08 |

FOREIGN PATENT DOCUMENTS

WO WO9843237 2/1998

OTHER PUBLICATIONS

Haykin, Simon; "Adaptive Filter Theory", third edition; Prentice Hall, Upper Saddle river, NJ 07458, 1996, pp. 2-5 and 9-21.*

* cited by examiner

*Primary Examiner*—William Trost
*Assistant Examiner*—Meless Zewdu

(57) ABSTRACT

This invention is directed toward improving the subjective voice quality of a mobile to mobile phone call having tandem vocoder processing by modifying the spectrum of the voice signal before it is processed by the second vocoder to compensate for digital distortion which is generated by the second vocoder. An adaptive filter can be used to modify the spectrum of the voice signal. With this invention, the voice quality of a call from a first mobile phone to a second mobile phone has a quality that is substantially similar to the voice quality of a call from a mobile phone to a desk phone.

15 Claims, 7 Drawing Sheets

MOBILE TO MOBILE DIGITAL WIRELESS CONNECTION HAVING ENHANCED VOICE QUALITY

BACKGROUND OF THE INVENTION

1. Field of the Invention

The present invention relates generally to wireless communication, and more particularly to mobile to mobile wireless communications connections having improved voice quality.

2. Description of the Related Art

Wireless telephone communication systems utilize encoding to limit the amount of bandwidth required to transmit voice information over a communication channel. Instead of sending the received voice over the channel, a voice coder (vocoder) is used to first analyze the received voice signal and then generate a set of parameters which are used to drive a model that synthesizes a replica of the voice. It is these parameters that are transmitted at very low rates over the telephone network. Typically, in one type of vocoder, the voice is analyzed on a short time basis and a set of model parameters which may represent pitch, line spectrum frequencies (the frequency response of the vocal tract at any given time) and voice gain are generated.

In a digital wireless network, a vocoder is used at the transmitter to divide the voice signal of the person talking into a stream of fixed length frames of typically 20 msec. The vocoder then models the voice using a specific mathematical model and for each 20 msec frame, the vocoder generates a set of parameters for that mathematical model that best describes the voice for that 20 msec interval. Thus, the vocoder encodes the voice of the speaker into 20 msec frames. Each one of the frames carries a set parameter that represents the speaker's voice for the corresponding 20 msec interval. A modem at the transmitter transmits these frames over the air using an air interface technique such as CDMA, TDMA, or GSM. The modem function at the receiver passes the frames to a decoder at the receiver. The decoder decodes the 20 msec frames to produce the voice of the subscriber. A wireless subscriber uses a wireless terminal to access the wireless network.

The audio path from a mobile station to a desktop phone consists of a voice encoder at the mobile station, a wireless transmitter at the mobile station, a wireless receiver at the base station, and a decoder at the base station. There is one voice encoder and one decoder involved in the processing of the audio signal. This process is referred to as being a single vocoding operation because it involves a single encoding/decoding process.

The audio path from a first mobile station to a second mobile station consists of a voice encoder and a wireless transmitter at the first mobile station, and a wireless receiver and a voice decoder at the base station (or at the switch). The voice signal of the subscriber generated by the decoder is transmitted over the carrier's land lines to a second voice encoder at the second base station (or at the switch), and then to a wireless transmitter. A wireless receiver at the second mobile station receives the encoded voice signal and processes it in a second decoder to generate a voice signal. In this case, from the voice processing perspective, there is one voice encoder at the first mobile station, one decoder at the base station, another voice encoder at the second base station and a second decoder at the receiving mobile station. Thus, when a call is made from one mobile station to another mobile station, the voice signal is processed by two voice encoders and two decoders. This process is referred to as tandem vocoding processing because the voice signal is encoded twice and decoded twice.

The processing of the voice signal (the input speech) by the vocoding process (the process of encoding and decoding the voice signal) introduces a certain amount of digital distortion into the voice generated at the receiver relative to the actual voice uttered by the speaker. While, the quality of the voice generated by the decoder in single vocoding processing is very acceptable, it is somewhat below the voice quality of the input speech. Tandem vocoding compounds the digital distortion introduced into the voice signal and, therefore, it has been observed that the subjective voice quality of a mobile to mobile call is noticeably below that of a mobile to desk phone call. Thus, there exists a need to provide a method and apparatus for enhancing the voice quality of a mobile to mobile call.

SUMMARY OF THE INVENTION

This invention is directed toward improving the subjective voice quality of a mobile to mobile phone call having tandem vocoder processing by modifying the spectrum of the voice signal before it is processed by the second vocoder to compensate for digital distortion which is generated by the second vocoder. An adaptive filter can be used to modify the spectrum of the voice signal. With this invention, the voice quality of a call from a first mobile phone to a second mobile phone has a quality that is substantially similar to the voice quality of a call from a mobile phone to a desk phone.

DETAILED DESCRIPTION OF THE INVENTION

As noted previously, in a mobile to desk phone conversation, the speech signal goes through a single vocoding process which introduces a small amount of digital distortion into the produced speech. Thus, the quality of the produced speech is somewhat less than that of the input speech. For a call between two mobile stations where the voice signal is subjected to the vocoding process twice, the subjective voice quality of the produced speech experiences increased digital distortion and, therefore, is inferior to speech produced by a voice signal that had experienced only single vocoding processing.

Referring to Table A below, there is provided the Mean Opinion Score of the quality of a speech signal generated with single vocoding processing and tandem vocoding processing for various vocoders. The Mean Opinion Score is a measure of voice quality using the Vocoder Mean Opinion Score Conformance Test standards document (TIA/EIA/IS 102) which is the standard subjective voice quality measurement metric. The higher score numbers represent better voice quality.

TABLE A

| | Mean Opinion Score | |
|---|---|---|
| Vocoder Type | Single Vocoding | Tandem Vocoding |
| EVRC | 3.80 | 3.34 |
| QCELP13 | 3.88 | 3.60 |
| ACELP | 3.91 | 3.67 |
| VSELP | 3.85 | 3.13 |

The vocoders listed above are more fully identified as follows:

EVRC refers to Enhanced Variable Rate Codec

QCELP refers to Qualcomm Code Excited Linear Prediction Codec

ACELP refers to Algeraic Code excited Linear Predictor

VSELP refers to Vector Sum Excited Linear Predictor.

A review of the data in Table A will clearly show that in each instance tandem vocoding of a voice signal introduces increased distortion over that of single vocoding and that this is so regardless of the type of voice coder used for the processing of voice signals.

The subjective voice quality of a given voice signal is a nonlinear function of many variables such as:

1) Voice intelligibility;

2) Voice clarity;

3) Amount of background noise in the voice;

4) Digital distortion in the voice;

5) Additive noise; and

6) Frequency content of the voice (spectrum).

This invention is directed towards improving the quality of the voice generated by a voice signal subjected to tandem vocoding processing to be substantially equal to the quality of the voice generated by a voice signal that is subjected to single vocoding processing. The improvement is obtained by compensating for the digital distortion that is introduced by the second vocoding processing by modifying the frequency content of the voice signal before it is processed by the second vocoder.

Figure 1:
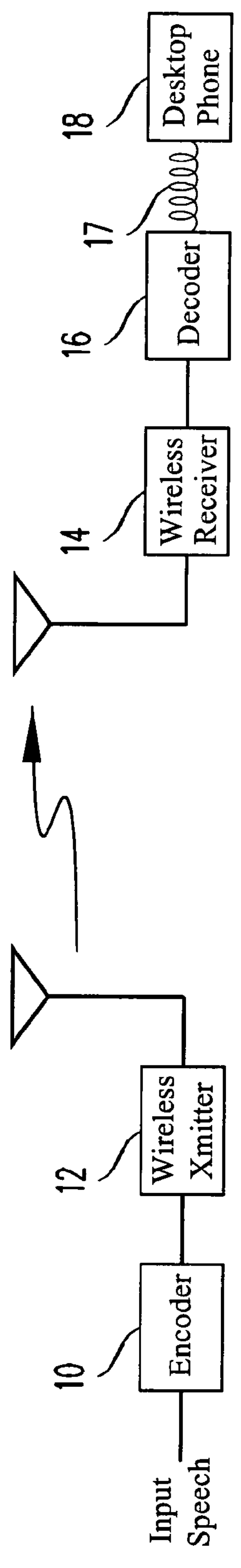
FIG. 1 (prior art)
FIG. 1 is a block diagram of a mobile to desk phone call having single vocoding processing.

Referring to FIG. 1, there is illustrated a block diagram of a mobile to desk phone call having single vocoding processing. The voice of a caller at a mobile station is processed by a voice coder (encoder) 10 and then fed to a wireless transmitter 12 for transmission to wireless receiver 14. The signal from receiver 14 is then fed to decoder 16. The output of decoder is transmitted over a path 17 that may include land lines to a desk top phone 18. The voice signal from the mobile station to the desk top phone is processed by one encoder 10 and one decoder 16 and, therefore, it is subjected to single vocoding processing.

Figure 2:
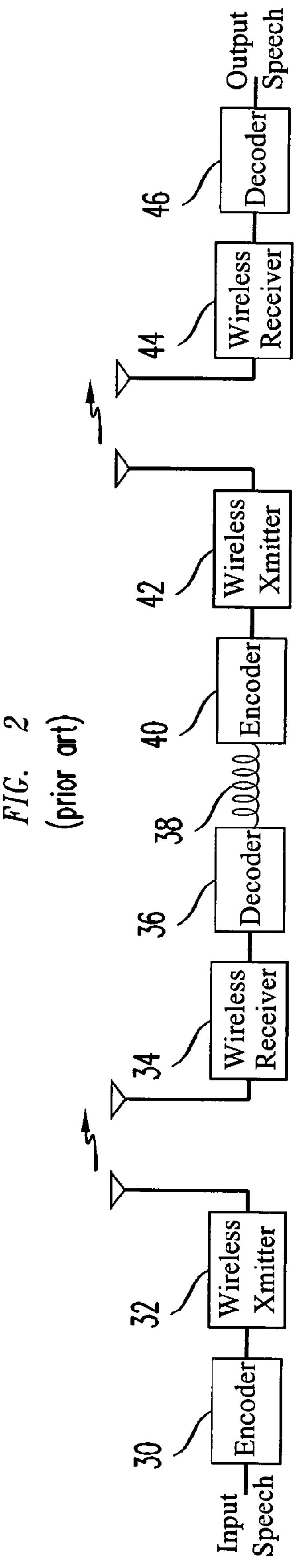
FIG. 2 (prior art)
FIG. 2 is a block diagram of a mobile to mobile call having double vocoding processing.

Referring to FIG. 2, there is illustrated the block diagram of double vocoding processing. The voice of a caller at a first mobile station is processed by encoder 30, the output of which is fed to wireless transmitter 32 which transmits the signal to wireless receiver 34. The output of wireless receiver 34 is fed to decoder 36 which converts the received signal to a voice signal for transmission over the carrier's network which may include land lines 38. In this example, the originating call from the first mobile station is being sent to a second mobile station. Therefor, the voice signal from decoder 36 is sent via the carrier's network to a second encoder 40 where it is processed a second time, and then forward to wireless transmitter 42 for transmission to wireless receiver 44 located in the second or receiving mobile station. The signal from receiver 44 is fed to and processed by decoder 46, the output of which is the voice signal that is used to generate the voice heard by the person receiving the call. In FIG. 2, the call from the first mobile station to the second mobile station is encoded twice and decoded twice before it is received by the person called. Thus, in this example, the voice signal is subjected to tandem vocoding processing.

Figure 3:
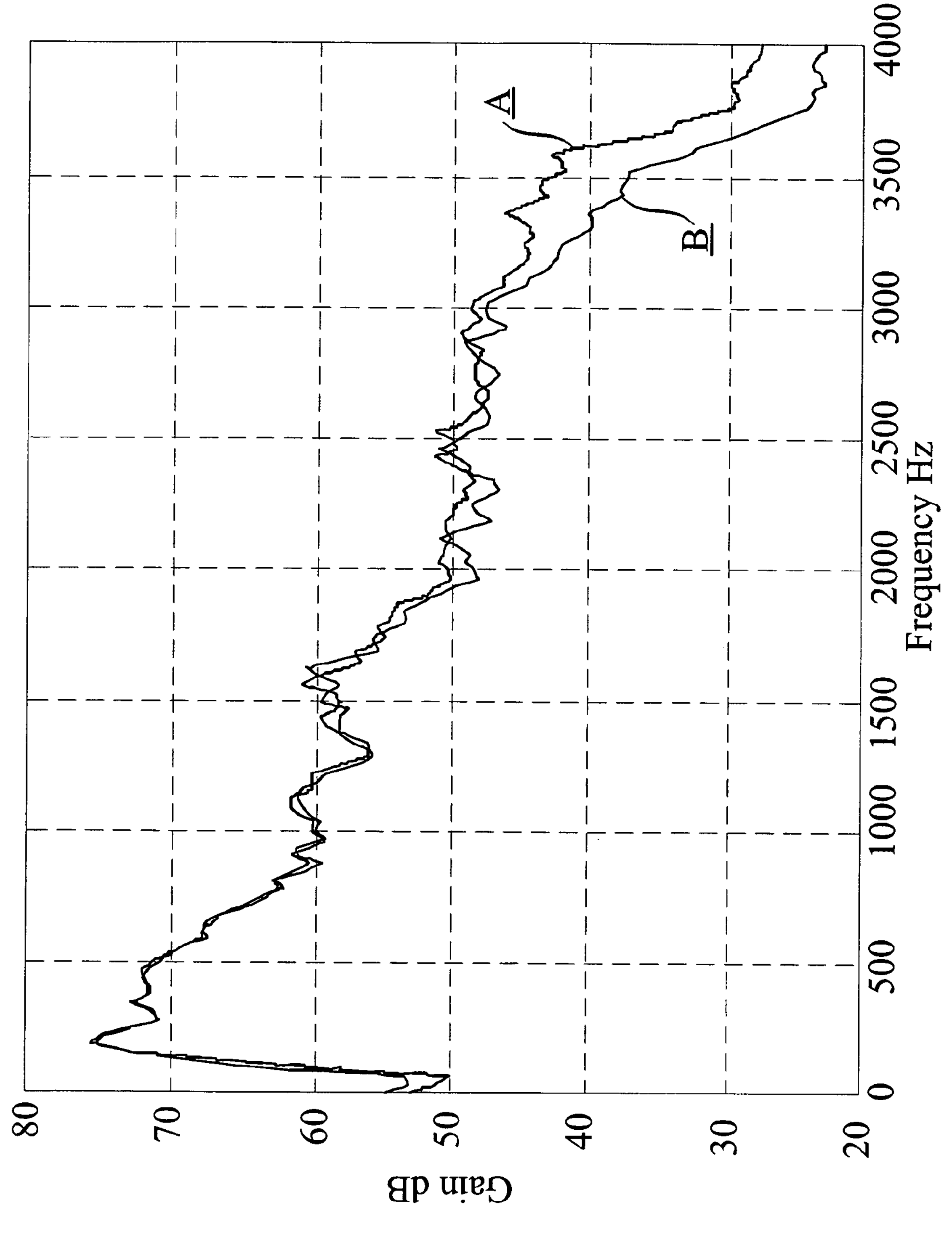
FIG. 3 (prior art)
FIG. 3 illustrates the spectrum of the output speech produced during single vocoding processing (graph A) and double vocoding processing (graph B) for the same phonetically balanced input voice signal.

Referring to FIG. 3, there is illustrated two graphs of the frequency content of phonetically balanced voice subjected to single and tandem processing using EVRC vocoders. Phonetically balanced voice consists of a group of sentences having almost all of the phonetic transitions of the English language. The voice signal consists of 5 male and 5 female voices. Graph A is of the voice produced by single vocoding processing and Graph B is of the voice produced by tandem vocoding processing. As illustrated in FIG. 3, the voice produced by a voice signal that is subjected to tandem vocoding processing has less energy in the high frequency end compared to the voice signal produced by single vocoding processing.

This invention is directed toward improving the quality of the voice generated by a voice signal subjected to tandem vocoding by changing the spectrum of the voice signal prior to it being subjected to the second vocoding operation to compensate for digital distortion which will be generated by the second vocoding operation. This can be achieved with an adaptive filter located upstream of the second vocoder of the tandem vocoder arrangement. The adaptive filter can be a stand alone item, a part of the back end of the first decoder or a part of the front end of the second encoder.

Figure 4:
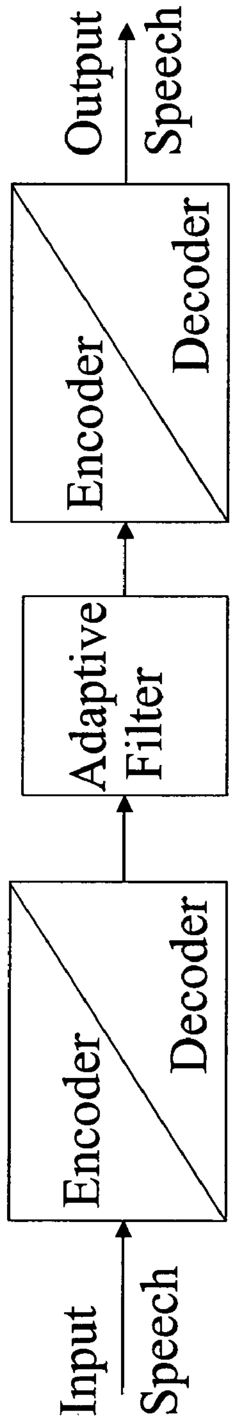
FIG. 4 is a block diagram of one embodiment of structure in accordance with the principles of the invention.
Figure 5:
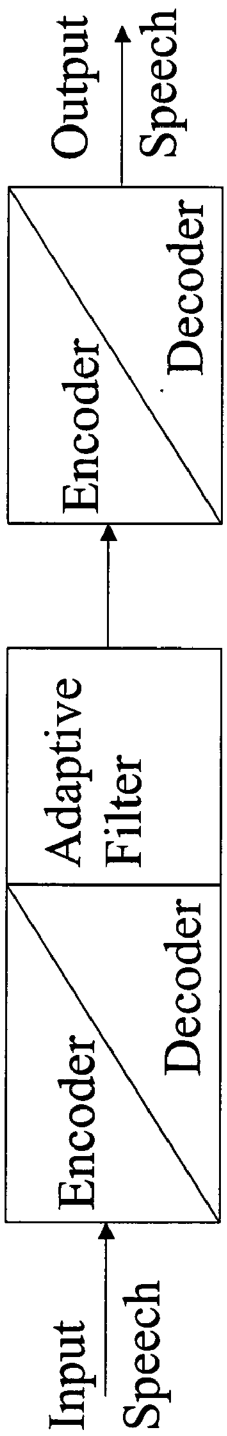
FIG. 5 is a block diagram of another embodiment of structure in accordance with the principles of the invention.
Figure 6:
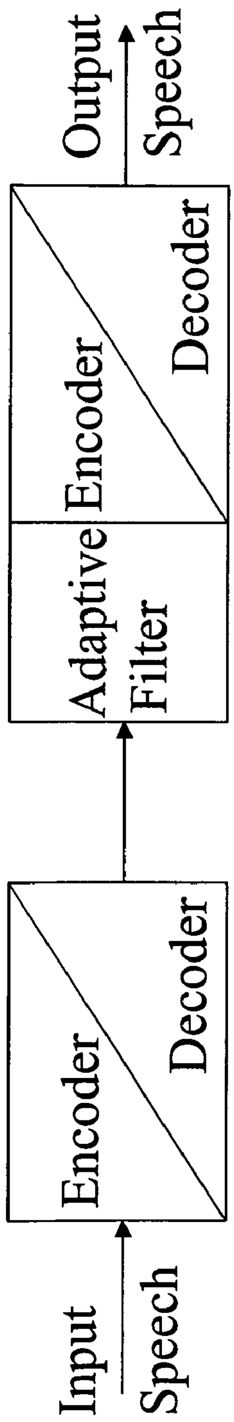
FIG. 6 is a block diagram of still another embodiment of structure in accordance with the principles of the invention.

Referring to FIGS. 4, 5 and 6, there is illustrated three possible locations of the adaptive filter. FIG. 4 is a block diagram of structure in accordance with the principles of the invention where the adaptive filter is located between the first decoder and the second encoder. FIG. 5 shows the adaptive filter as a part of the back end of the decoder of the party making the call. FIG. 6 shows the adaptive filter as a part of the front end of the encoder of the party receiving the call. In each instance, the adaptive filter is located between the first decoder and the second encoder.

Figure 7:
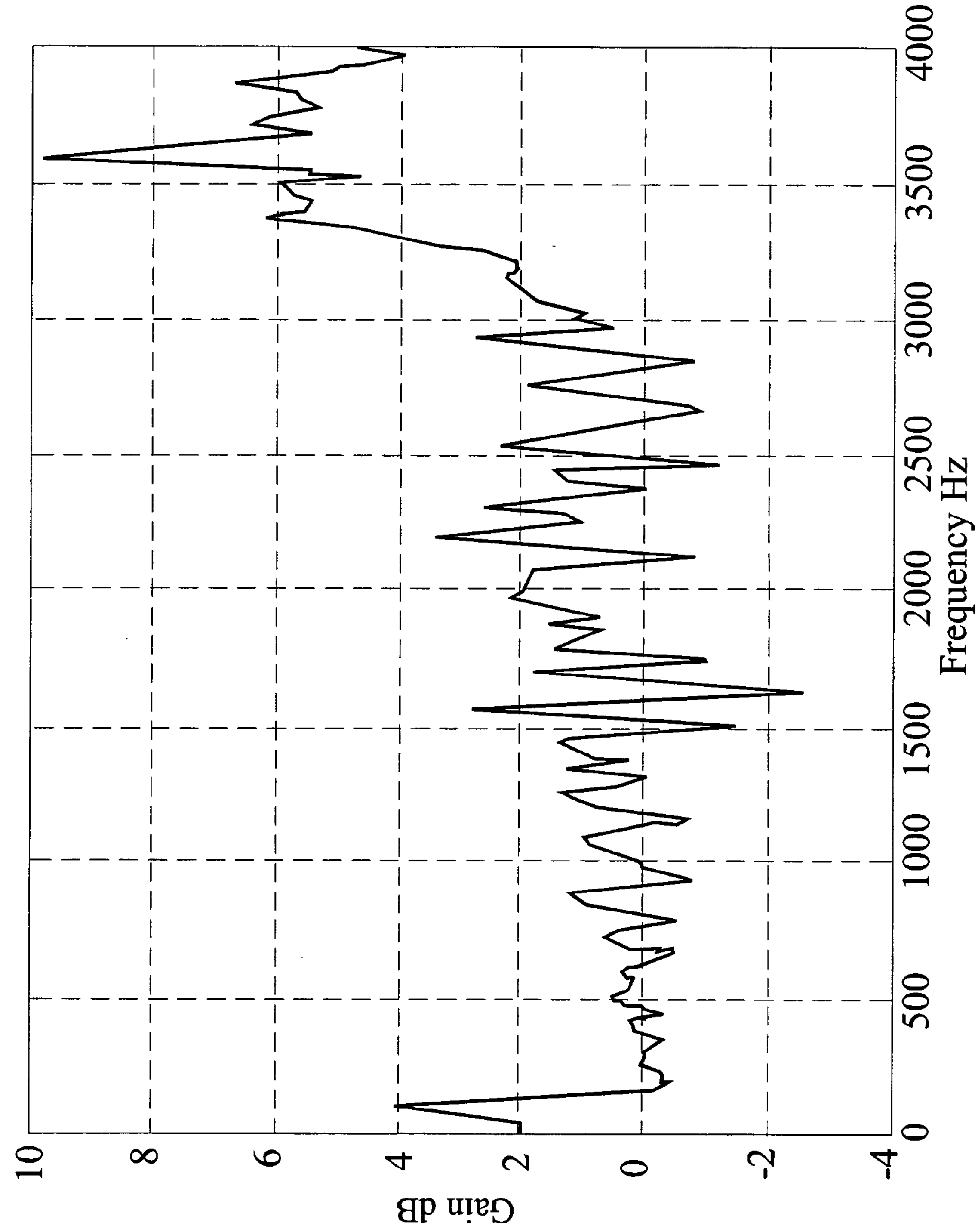
FIG. 7 illustrates the difference in the spectrum of two signals, one that is subjected to tandem vocoding processing and the other that is subjected to single vocoding processing.

FIG. 7 illustrates a graph of the difference in the spectrum of one signal that is subjected to tandem vocoder processing and another signal that is subjected to single vocoding processing. A study of FIG. 7 will show that there is a marked difference between the two as the frequency increases above 3000 Hz; and, there is a smaller but possibly significant difference from 1500 Hz to 3000 Hz. An adaptive filter designed to reduce the difference above 3000 Hz will provide significant results, and further improvement can be obtained by reducing the difference from 1500 Hz to 3000 Hz. Still further improvement can be obtained by reducing the difference that occurs between 500 Hz and 1500 Hz.

Figure 8:
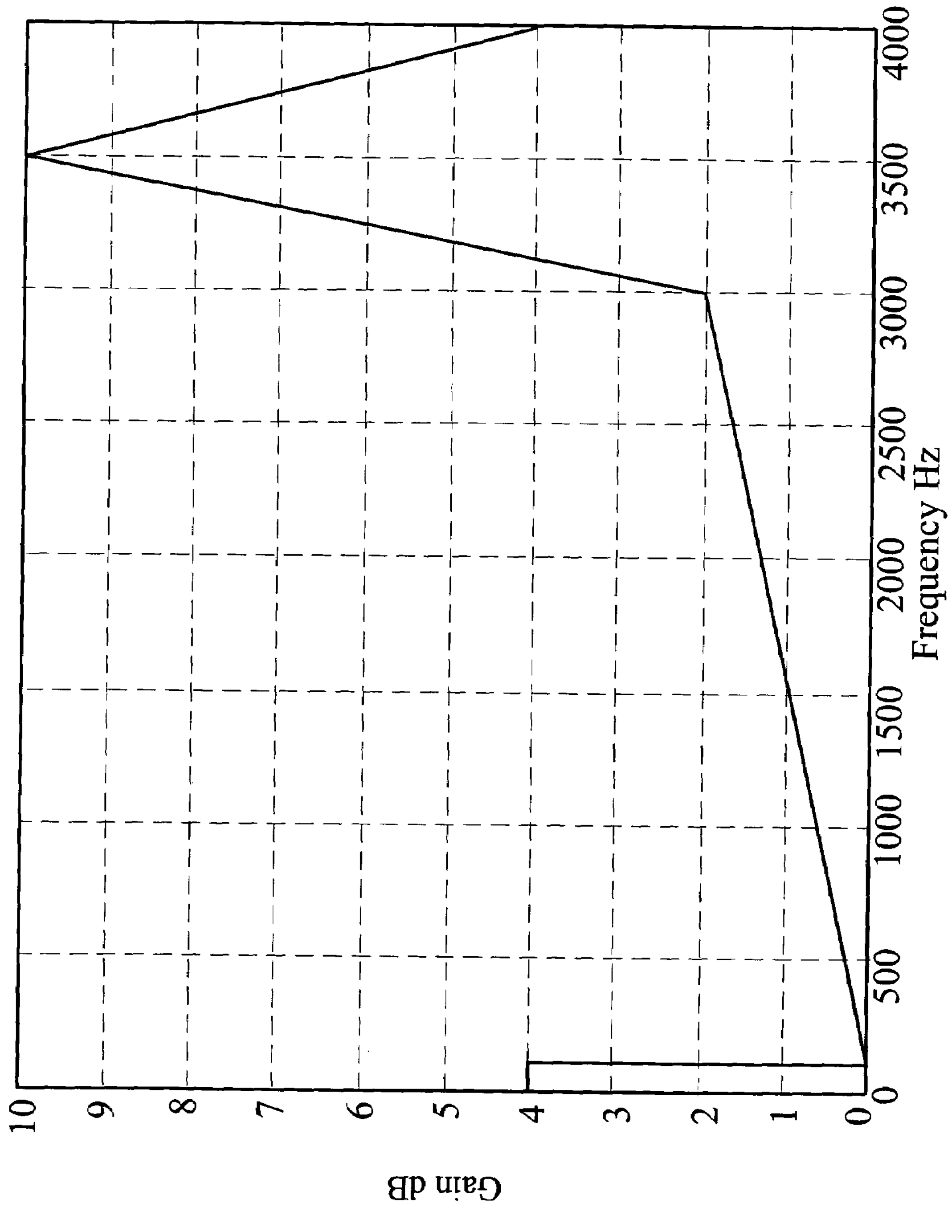
FIG. 8 illustrates the frequency response of an adaptive filter which can be located between two vocoders in tandem to compensate for digital distortion generated by the second vocoder.

Referring to FIG. 8, there is illustrated the graph of the frequency response of an adaptive filter which can be used to modify the spectrum of a voice signal fed to the second encoder.

Figure 9:
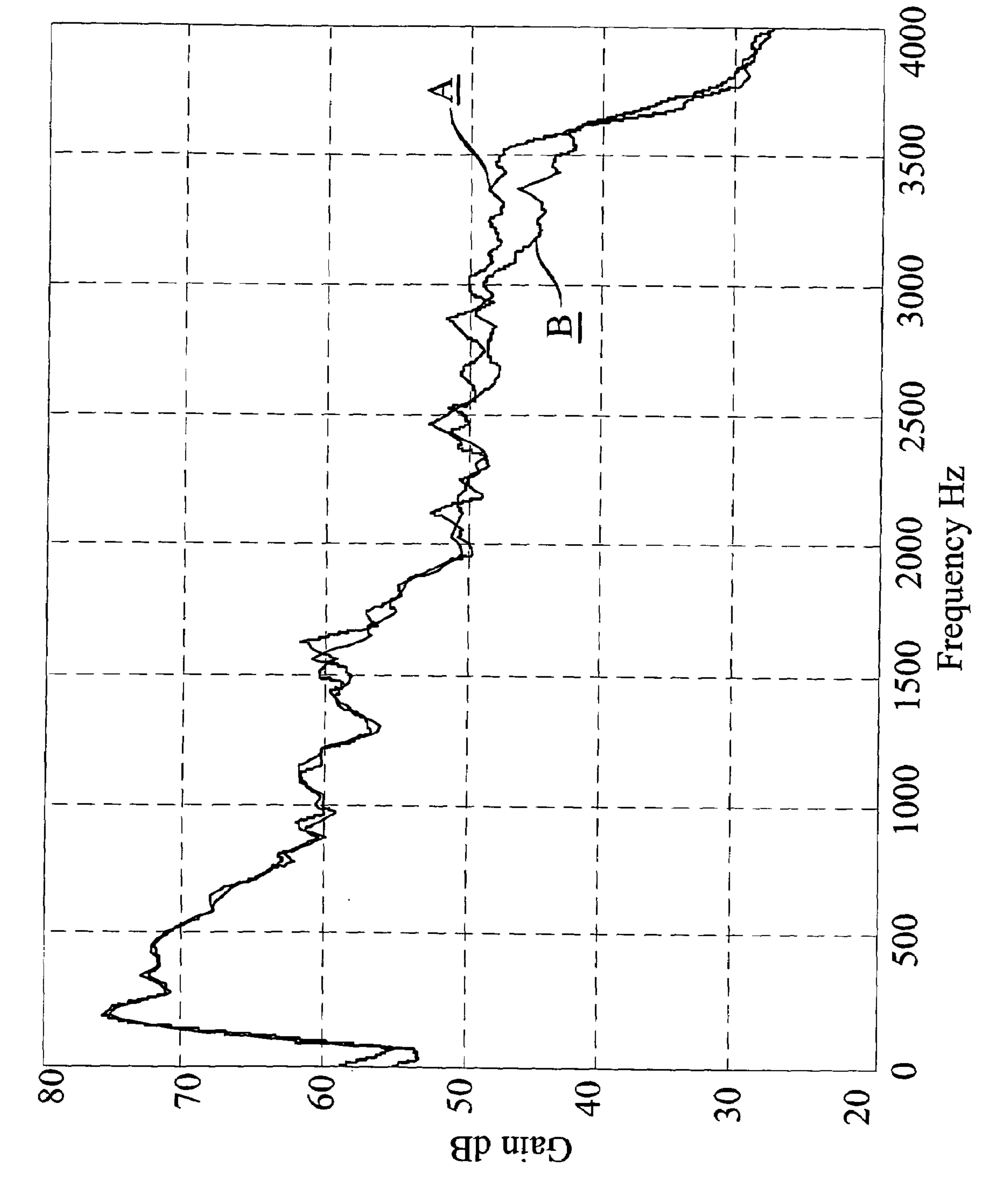
FIG. 9 illustrates the spectrum of a voice signal processed by tandem vocoding including the adaptive filter of FIG. 7 relative to the spectrum of a voice signal processed by single vocoding.

FIG. 9 is a graph of the spectrum of a voice signal that was subjected to tandem vocoding with an adaptive filter (plot A) relative to the spectrum of a voice signal subjected to single vocoding (plot B) for one type of vocoder. Improvement of the spectrum of a signal subjected to double vocoding can be obtained by using an adaptive filter which modifies the spectrum of the voice signal from the first decoder to compensate for digital distortion which will be generated by the second decoder. Depending upon the vocoder being used, the adaptive filter can cause the spectrum of the modified signal to be close to that of the spectrum of the signal from the first vocoder for frequencies below 2400 Hz and boost the frequencies above 2400 Hz of the signal from the first vocoder by an amount from 0 to 10 db.

Figure 10:
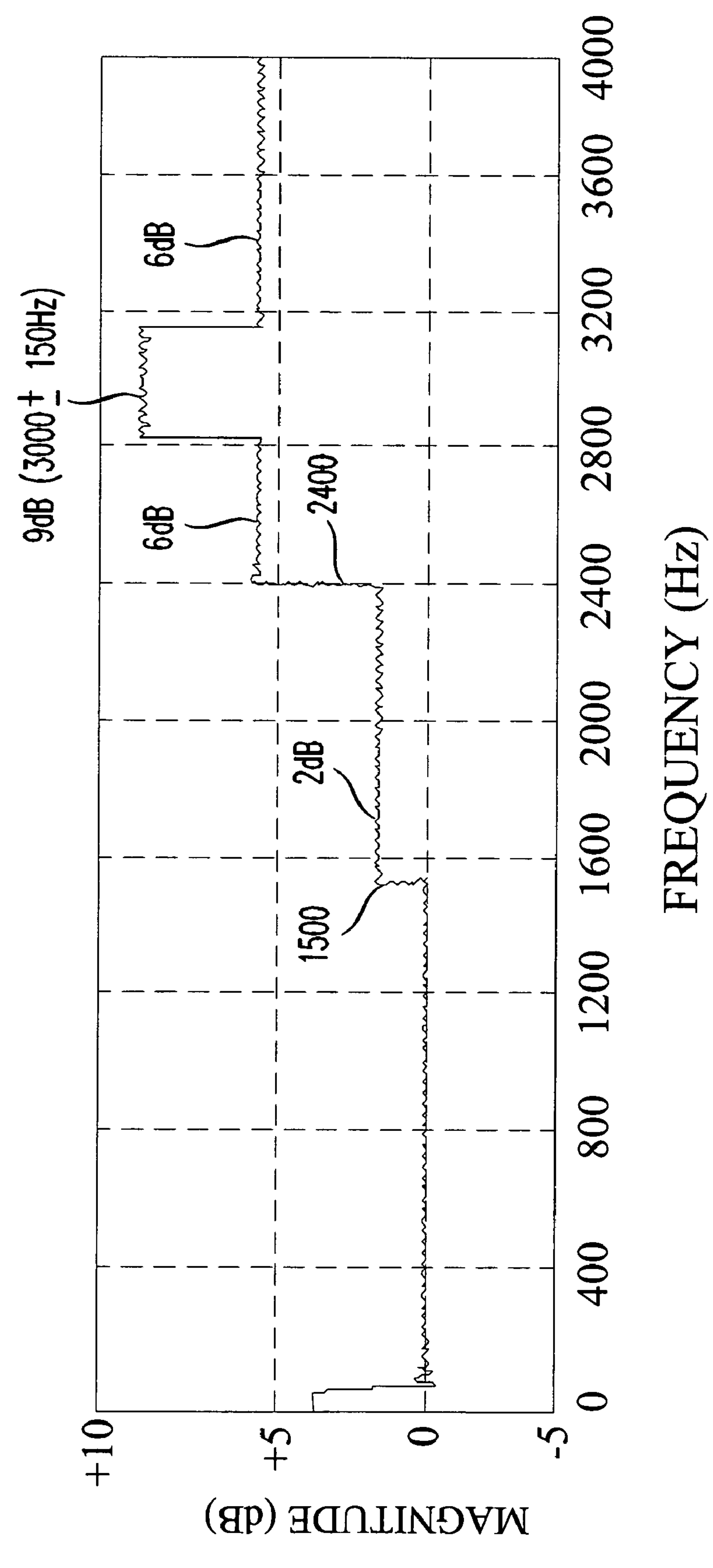
FIG. 10 illustrates the plot of the frequency response of an adaptive filter for use with two EVRC vocoders in tandem.

FIG. 10 illustrates the graph of the frequency response of an adaptive filter designed for use with two EVRC vocoders in tandem. In this embodiment, the filter is designed to pass, without change, those frequencies from the first decoder which are below 1500 Hz; to increase the db of frequencies which fall between 1500 Hz and 2400 Hz by about 2 db; to increase the db of frequencies which fall between about 2400 Hz and 2850 Hz by about 6 db; to increase the db of frequencies which fall between about 2850 Hz and 3150 Hz by about 9 db; and to increase the db of frequencies which fall between about 3150 Hz and 4000 Hz by about 6 db.

The quality of the voice generated when a voice signal was processed with single vocoding, tandem vocoding and tandem vocoding with an adaptive filter having a frequency response similar to that of FIG. 10 were evaluated using golden ear experts in the voice quality group. The results obtained indicated that the quality of the voice generated by the voice signal processed with tandem vocoding and the adaptive filter was not only better than the voice generated without the adaptive filter, but it was close to the quality of the voice generated by voice signals processed with single vocoding. The adaptive filter can be designed to modify the spectrum of the voice signal from the first vocoder to compensate for substantially all digital distortion due to the second vocoding processing.

Although the present invention has been described with respect to a typical and a preferred embodiment, it should be understood that various changes, substitutions and modifications may be suggested to one skilled in the art and it is intended that the present invention encompass such changes, substitutions and modifications as fall within the scope of the appended claims.

What is claimed is:

1. A method for communicating characterized by the step of:

receiving a first encoded voice signal as a first set of voice signal parameters;

directing the first set of voice signal parameters to a first speech decoder to generate a voice signal;

feeding the voice signal from the first speech decoder to an adaptive filter to produce a modified voice signal, the adaptive filter being operative to modify the spectrum of the voice signal from the first speech decoder so as to substantially compensate for spectral distortion introduced by an encoding and decoding of the voice signal;

feeding the modified voice signal to a speech encoder to convert the modified voice signal into an encoded modified voice signal represented by a second set of voice signal parameters; and transmitting the second set of voice signal parameters.

2. The method of claim 1 further comprising the step of:

modifying the spectrum of the voice signal from the first speech decoder using the adaptive filter which compensates for digital distortion which will occur when the encoded modified voice signal represented by the second set of voice signal parameters is decoded.

3. The method of claim 1 wherein:

the dB of frequencies above 2400 Hz of the modified voice signal have increased magnitude of from 0 to 10 dB.

4. The method of claim 1 wherein:

the dB of frequencies below 2400 Hz of the modified voice signal have increased magnitude of from 0 to 6 dB.

5. The method of claim 1 wherein:

the dB of frequencies above 2000 Hz of the modified voice signal have increased magnitude of from 2 to 8 dB.

6. The method of claim 1 wherein:

the dB of frequencies between 1500 Hz and 2400 Hz of the modified voice signal have increased magnitude of from 0 to 2 dB.

7. The method of claim 1 wherein:

the dB of frequencies between 2400 Hz and 2850 Hz, and those that are between 3150 Hz and 4000 Hz of the modified voice signal have increased magnitude of from 4 to 8 dB.

8. The method of claim 1 wherein:

the dB of frequencies between 2850 Hz and 3150 Hz of the modified voice signal have increased magnitude of from 7 to 11 dB.

9. A wireless call connection characterized by:

a speech decoder coupled to a wireless receiver for receiving a signal made up of a set of parameters represented of a voice signal and for converting the received signal to a voice signal;

an adaptive filter coupled to receive the voice signal from the speech decoder to produce a modified voice signal which, when encoded, will produce a second signal made up of another set of parameters representative of the voice signal, the adaptive filter being operative to modify the spectrum of the voice signal from the speech decoder so as to substantially compensate for spectral distortion introduced by an encoding and decoding of the voice signal.

10. The wireless call connection of claim 9 wherein the adaptive filter modifies the magnitude of selective frequencies of the spectrum of the voice signal from the decoder.

11. The wireless call connection of claim 10 wherein the adaptive filter modifies the magnitude of selective frequencies of the spectrum of the voice signal from the decoder to compensate for digital distortion caused by encoding and decoding the modified voice signal.

12. The wireless call connection of claim 10 wherein the adaptive filter increases the dB of frequencies above 3000 Hz of the voice signal from the decoder to compensate for digital distortion caused by encoding and decoding the modified voice signal from the adaptive filter.

13. The wireless call connection of claim 10 wherein the adaptive filter increases the dB of frequencies above 1500 Hz of the voice signal from the decoder to compensate for digital distortion caused by encoding and decoding the modified voice signal from the adaptive filter.

14. The wireless call connection of claim 10 wherein the adaptive filter increases the dB of frequencies above 300 Hz of the voice signal from the decoder to compensate for digital distortion caused by encoding and decoding the modified voice signal from the adaptive filter.

15. The wireless call connection of claim 9 wherein the adaptive filter increases the dB of selective frequencies of the spectrum of the voice signal from the decoder to cause the spectrum of a voice signal generated by subsequent encoding and decoding of the modified signal to be close to that of the voice signal from the speech decoder.

* * * * *